United States Patent
Chauval et al.

(10) Patent No.: US 10,999,217 B2
(45) Date of Patent: *May 4, 2021

(54) ELECTRICAL COMPUTER SYSTEM PROCESSING ARCHITECTURE FOR EQUITABLE ASSIGNMENT OF IMPROVEMENTS

(71) Applicant: NEX Services North America LLC, Jersey City, NJ (US)

(72) Inventors: Jason Chauval, London (GB); Christopher Freedlander, London (GB); David J. Lyons, Wesport, CT (US)

(73) Assignee: NEX Services North America LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,273

(22) Filed: Nov. 19, 2019

(65) Prior Publication Data

US 2020/0092225 A1    Mar. 19, 2020

Related U.S. Application Data

(63) Continuation of application No. 15/450,516, filed on Mar. 5, 2017, now Pat. No. 10,516,624.

(Continued)

(51) Int. Cl.
*G06F 15/16*    (2006.01)
*H04L 12/911*    (2013.01)
(Continued)

(52) U.S. Cl.
CPC .......... *H04L 47/821* (2013.01); *H04L 67/322* (2013.01); *G06Q 40/04* (2013.01)

(58) Field of Classification Search
CPC ...... H04L 47/821; H04L 67/322; G06Q 40/04
See application file for complete search history.

(56) References Cited

U.S. PATENT DOCUMENTS

| 5,375,055 A |   | 12/1994 | Togher |
| 5,937,205 A | * | 8/1999 | Mattson ............... G06F 13/1642 |
|  |  |  | 710/41 |

(Continued)

FOREIGN PATENT DOCUMENTS

| EP | 0399850 A3 | 9/1991 |
| WO | WO0198960 A2 | 12/2001 |

*Primary Examiner* — Padma Mundur
(74) *Attorney, Agent, or Firm* — Lempia Summerfield Katz LLC

(57) ABSTRACT

An electrical computer system processing architecture for providing fairness amongst client computers of the computer system is disclosed. The electrical computer system processing architecture comprises a plurality of client computers connected to at least one server by a computer network. Each of the client computers is configured to provide requests to the at least one server. The or each server comprises a store for storing requests provided by the plurality of client computers. The or each server is configured to: match complementary requests from the plurality of client computers stored in the store; following matching of complementary requests, assign an indication of how well the requests have been met compared to requests of other client computers of the computer system; accumulate the indications to form an accumulation of indications; and when the accumulation exceeds a predetermined threshold, match future requests in favor of the client computer whose requests have not been met as favorably with requests of other client computers of the computer system, thereby providing fairness amongst client computers of the computer system.

20 Claims, 7 Drawing Sheets

Related U.S. Application Data

(60) Provisional application No. 62/304,505, filed on Mar. 7, 2016, provisional application No. 62/304,415, filed on Mar. 7, 2016.

(51) Int. Cl.
*H04L 29/08* (2006.01)
*G06Q 40/04* (2012.01)

(56) References Cited

U.S. PATENT DOCUMENTS

2005/0097026 A1* 5/2005 Morano ............... G06Q 40/04
 705/37
2017/0039639 A1* 2/2017 Singer .................. G06Q 40/04

\* cited by examiner

ELECTRICAL COMPUTER SYSTEM PROCESSING ARCHITECTURE FOR EQUITABLE ASSIGNMENT OF IMPROVEMENTS

CROSS-REFERENCE TO RELATED APPLICATION

This application is a continuation under 37 C.F.R. § 1.53(b) of U.S. patent application Ser. No. 15/450,516 filed Mar. 6, 2017, now U.S. Pat. No. 10,516,624 which claims the benefit of U.S. Patent Application No. 62/304,505 filed Mar. 7, 2016 and U.S. Patent Application No. 62/304,415 filed Mar. 7, 2016, all of which are hereby incorporated by reference in their entirety and relied upon.

FIELD OF THE INVENTION

The present invention relates to an electrical computer system processing architecture and, in particular, an electrical computer system processing architecture that provides fairness amongst computers of the system.

BACKGROUND OF THE INVENTION

Today's computer systems typically include many different computers such as servers and general-purpose personal computers (such as, desktop and laptop computers) acting as clients that are connected to the servers on a computer network. The servers provide resources to the clients by request of the clients. Each server can match complementary requests from the clients using the server. However, this type of system may appear to bias one client's requests over another client's requests.

BRIEF SUMMARY OF THE INVENTION

Embodiments of the present invention solve the technical problem of providing fairness amongst computers using a shared computer system and, in particular, in a complex computer system involving many client computers connected to a server on a computer network.

The invention in its various aspects is defined in the independent claims below to which reference should now be made. Advantageous features are set forth in the dependent claims.

Arrangements are described in more detail below and take the form of an electrical computer system processing architecture for providing fairness amongst client computers of the computer system is disclosed. The electrical computer system processing architecture comprises a plurality of client computers connected to at least one server by a computer network. Each of the client computers is configured to provide requests to the at least one server. The or each server comprises a store for storing requests provided by the plurality of client computers. The or each server is configured to: match complementary requests from the plurality of client computers stored in the store; following matching of complementary requests, assign an indication of how well the requests have been met compared to requests of other client computers of the computer system; accumulate the indications to form an accumulation of indications; and when the accumulation exceeds a predetermined threshold, match future requests in favor of the client computer whose requests have not been met as favorably with requests of other client computers of the computer system, thereby providing fairness amongst client computers of the computer system.

In an aspect of the present invention, there is provided an electrical computer system processing architecture for providing fairness amongst client computers of the computer system, the electrical computer system processing architecture comprising: a plurality of client computers being connected to at least one server by a computer network; each of the client computers being configured to provide requests to the at least one server; the or each server comprising a store for storing requests provided by the plurality of client computers, the or each server being configured to: match complementary requests from the plurality of client computers stored in the store, following matching of complementary requests, assign an indication of how well the requests have been met compared to requests of other client computers of the computer system; accumulate the indications to form an accumulation of indications; and when the accumulation exceeds a predetermined threshold, match future requests in favor of the client computer whose requests have not been met as favorably with requests of other client computers of the computer system, thereby providing fairness amongst client computers of the computer system.

The requests may be provided in XML format.

The complementary requests may be matched by time priority provided by the plurality of client computers.

The or each server may be further configured to not match requests in favor of the client whose requests have not been met as favorably once the predetermined threshold is no longer exceeded.

In an aspect of the present invention, there is provided a server forming part of an electrical computer system processing architecture, the server for providing fairness amongst client computers using the server, the server comprising: a store for storing requests provided by a plurality of client computers, the server being configured to: match complementary requests from the plurality of client computers stored in the store, following matching of complementary requests, assign an indication of how well the requests have been met compared to requests of other client computers using the server; accumulate the indications to form an accumulation of indications; and when the accumulation exceeds a predetermined threshold, match future requests in favor of the client computer whose requests have not been met as favorably with requests of other client computers using the server, thereby providing fairness amongst client computers using the server.

In another aspect of the present invention, there is provided a computerized method for providing fairness amongst client computers of a computer system, the computerized method comprising: a server of the computer system receiving requests from a plurality of client computers connected to the server by a computer network; the server storing the requests provided by the plurality of client computers; the server matching complementary requests from the plurality of client computers stored in the store, following matching of complementary requests, the server assigning an indication of how well the requests have been met compared to requests of other client computers of the computer system; accumulating the indications to form an accumulation of indications; and when the accumulation exceeds a predetermined threshold, matching future requests in favor of the client computer whose requests have not been met as favorably with requests of other client computers of the computer system, thereby providing fairness amongst client computers of the computer system.

In a further aspect of the present invention, there is provided a computer readable medium comprising instructions for carrying a method on a server for providing fairness amongst client computers using the server, the computerized method comprising: receiving requests from a plurality of client computers connected to the server by a computer network; storing the requests provided by the plurality of client computers; matching complementary requests from the plurality of client computers stored in the store, following matching of complementary requests, assigning an indication of how well the requests have been met compared to requests of other client computers of the computer system; accumulating the indications to form an accumulation of indications; and when the accumulation exceeds a predetermined threshold, matching future requests in favor of the client computer whose requests have not been met as favorably with requests of other client computers using the server, thereby providing fairness amongst client computers using the server.

One example of a type of computer system where it is very useful to have fairness amongst the computers of the computer system is an electronic trading system and, in particular, an anonymous trading computer system. These are highly complex computer systems with many components.

The real-time market insurance model (RMI) described herein allows clients or traders to bilaterally offset their risk positions against their trading counterparties. This is achieved as follows. Traders submit hidden orders into an electronic trading system. If a match occurs, risk is mitigated by assigning a blended mid-price directly retrieved from an anonymous market (such as EBS Market's central limit order book (CLOB)) and a market with disclosed prices (such EBS Direct's liquidity provider (LP) streams), thus neither counterparty needs to cross the spread. Additionally, a mark to market price (MtM) is assigned as explained below to the trade via a CLOB quote count product model (CLOB QC).

In examples of the present invention, the difference in price between the match price and the MtM price creates a profit and loss (PnL) position between the two counterparties that is added to an accumulative bilateral ledger. Once that PnL position reaches a certain predetermined threshold, price improvement is applied on subsequent trades in favor of the counterparty with the accumulated loss position until the value is brought back down to below the threshold value. Price improvement is where a higher bid price is attained for a sale or a lower ask price is attained to buy than the price at the time the order was submitted.

Examples of the present invention provide the technical advantage of eliminating the impact of technology on the electronic trading system. For example, traders and, in particular, algorithmic traders or computerized traders with quick communications do not have an advantage.

Examples of the present invention provide an electronic communication network (ECN) or electronic trading system that neutralizes PnL accumulation in near real-time. In the examples described, this is achieved by applying price improvement to each trade subsequent to a threshold breach. Examples of the present invention provide an ECN that neutralize PnL accumulation by changing the price of trades themselves rather than having to rely on further transactions between counterparties outside of trading activity.

In an aspect of the present invention, there is provided an electronic trading system for offsetting risk positions of trading counterparties on the electronic trading system, the electronic trading system comprising: a matching engine configured to: match orders between counterparties; assign a mid-price and a mark-to-market price to each matched order; form a profit and loss position between the counterparties based on an accumulated difference between a mid-price and a mark-to-market price of matched orders between the counterparties; and when the profit and loss position reaches a predetermined threshold, providing an indication that price improvement should be applied to further trades between the counterparties in favor of the counterparty with an accumulated loss position thereby offsetting the risk positions of the counterparties.

In a further aspect of the present invention, there is provided a matching engine for an electronic trading system for offsetting risk positions of trading counterparties on the electronic trading system, the matching engine being configured to: match orders between counterparties; assign a mid-price and a mark-to-market price to each matched order; form a profit and loss position between the counterparties based on an accumulated difference between a mid-price and a mark-to-market price of matched orders between the counterparties; and when the profit and loss position reaches a predetermined threshold, providing an indication that price improvement should be applied to further trades between the counterparties in favor of the counterparty with an accumulated loss position thereby offsetting the risk positions of the counterparties.

In an aspect of the present invention, there is provided a computerized method of offsetting risk positions of trading counterparties on an electronic trading system, the method comprising: counterparties submitting orders to an electronic trading system; a matching engine of the electronic trading system matching the orders between the counterparties; assigning a mid-price and a mark-to-market price to each matched order; forming a profit and loss position between the counterparties based on an accumulated difference between a mid-price and a mark-to-market price of matched orders between the counterparties; and when the profit and loss position reaches a predetermined threshold, providing an indication that price improvement should be applied to further trades between the counterparties in favor of the counterparty with an accumulated loss position thereby offsetting the risk positions of the counterparties.

The matching engine may have an order book which may be in the form of a central limit order book (CLOB). The orders may be limit orders. A limit order is an order to buy or sell at a specified price or better. A limit order may not be executed if the price set cannot be met during the time it is open. The orders may be provided in XML format. The orders may be matched in price/time priority where the time is the time the orders are submitted by an order input device or terminal.

Price improvement may be applied to one or more further trades between the parties if the indication that price improvement should be applied is provided.

Price improvement may not be applied if the accumulated difference between the mid-price and the mark-to-market price of matched orders between the counterparties; and the profit and loss position falls back below a predetermined threshold.

A computer readable medium, such as a CD-ROM, DVD-ROM, or USB flash drive, may be provided comprising instructions for carrying out the method described above on a computer.

BRIEF DESCRIPTION OF THE DRAWINGS

The invention will be described in more detail, by way of example, with reference to the accompanying drawings, in which.

Like features in the Figures have been given like reference numerals.

DETAILED DESCRIPTION OF THE INVENTION

Figure 1:
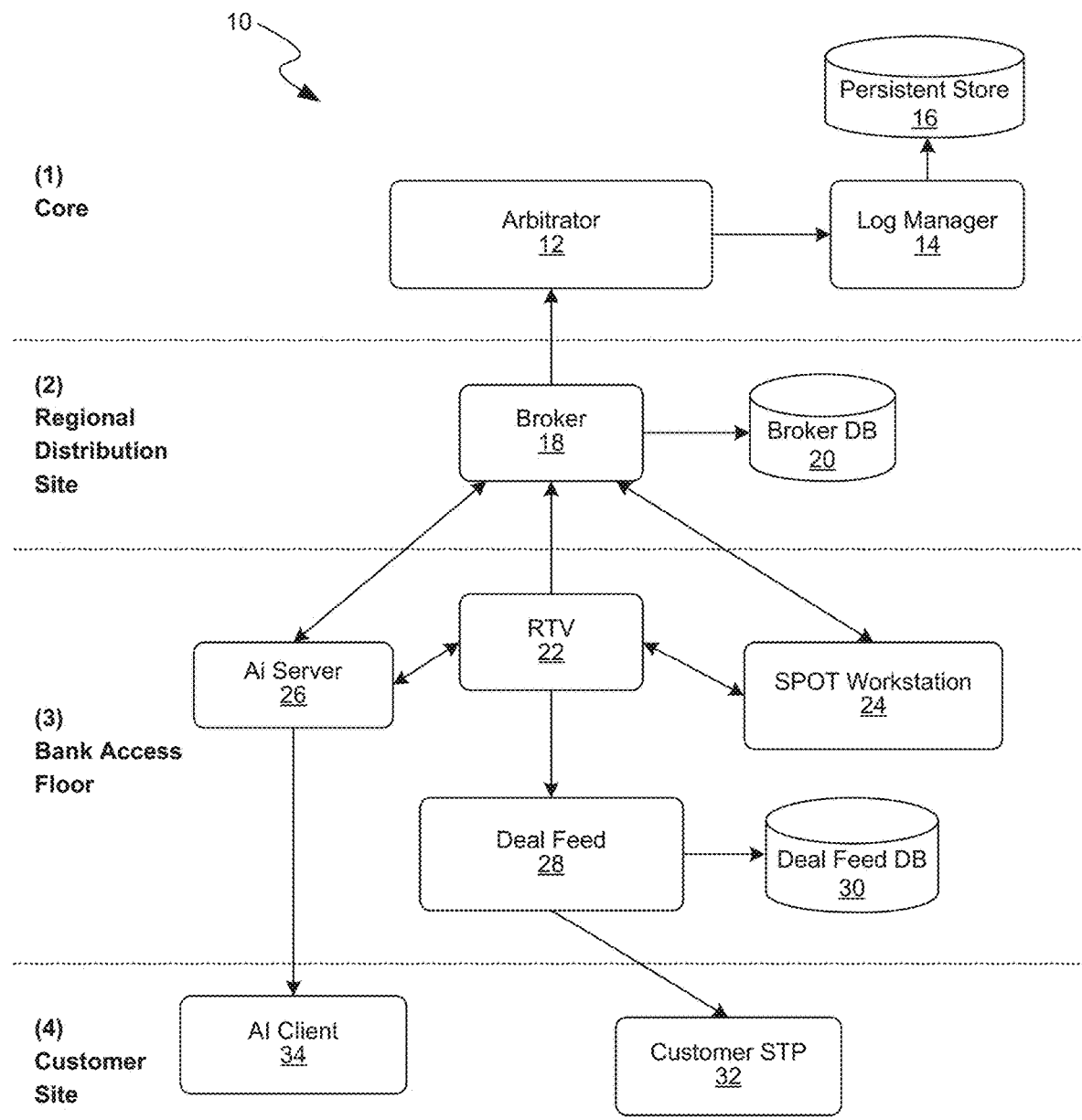
FIG. 1 is a schematic view of an electrical computer system processing architecture embodying an aspect of the present invention.

An electrical computer system processing architecture for providing an indication of activity in the computer system is illustrated in FIG. 1. The computer system comprises at least one server in the form of an arbitrator computer or matching engine 12 and a plurality of client computers in the form of broker computers or order input devices 18 that are connected to the at least one server by a computer network.

In this example, the computer system takes the form of an anonymous trading computer system. These types of computer system are widely used to trade fungible instruments, particularly financial instruments such as foreign exchange (FX) products. These systems have been very successful and are used for the majority of transactions in some instruments, for example, spot FX.

As their name suggests, anonymous trading systems do not allow the participants to know the identity of potential counterparties to a transaction until the trade has been confirmed. One well known system, the EBS platform, described in U.S. Pat. No. 5,375,055 incorporated herein by reference requires traders to input quotes in the forms of bids and offers into the system via their trader terminals. Quotes or orders have a price and an amount or size. These quotes are matched with other quotes in the system by a matching engine or arbitrator. Where a match is found, a deal will be executed between the parties, once it has been established that each party has sufficient credit with the other for the deal. A market distributor is arranged between the arbitrator and a bank node, at which is a credit matrix indicative of credit relationships assigned by a bank to all counterparties on the system. The market distributor is responsible for constructing a market view for each trading floor based on their credit as represented by the binary credit matrix stored at the market distributor. Thus, traders at a given trading floor are only shown quotes input into the system by parties with whom they have credit. In this platform, the actual credit limits are stored at bank nodes.

Once a deal has been concluded, details of the trade, including the identity of the parties and the price at which the deal was concluded, are distributed to all trading floors. Thus, the system is no longer anonymous once deals have been completed.

In this platform, visible quotes are matched with other quotes in the system by the matching engine or arbitrator in price/time priority. That is to say, when two or more parties submit an invisible order in response to a visible order, quotes with the best price are matched first, if there are two or more quotes at the same price, they are matched in time input into the system priority (the first order received is matched).

Increasingly, so called algorithmic or algo traders are traded on trading systems of this type together with human traders. Algo traders are programmed computers that react to market conditions to submit orders into the trading system. They can react much quicker than a human trader and so will generally be able to respond to changes in market data and respond more quickly in terms of order entry or cancel than human traders.

The computerized method and computer system is suitable for implementation on any credit screened electronic, computerized trading system or anonymous trading system for trading fungibles in the form of financial instruments such as foreign exchange products and, in particular, spot FX. Various examples exist in the prior art of such systems, including that of European patent application publication No. EP0399850 of Reuters Ltd, which discloses a centralized host system in which traders communicate via trader workstation computers with a host computer which holds credit, performs order matching and executes deals. U.S. Pat. No. 5,375,055 mentioned above discloses a distributed matching system in which matching takes place at arbitrator computers, but actual credit limits are held at bank node computers through which trader workstations communicate with the system. A yes/no credit matrix is stored at market distributor computers arranged between the bank nodes and the arbitrators and which are responsible for credit filtering of quotes on the basis of the credit matrix and for the formation and distribution of market views to trading floors. A further example is disclosed in international patent application with publication No. WO01/98960 which describes a distributed system using a network of broking node computers in which each broking node computer combines matching, market distribution and deal execution functionality. Hybrid systems also exist in which the broking node computer concept is incorporated into the distributed system of U.S. Pat. No. 5,375,055. Such a trading system 10 system is shown in FIG. 1 in which trading functionality is allocated to several progressively distributed tiers. Tiers 1 through 3 reside on the trading system provider network. Tier 4 represents the customer's or traders' own trading infrastructure.

Broadly, in this anonymous trading system traders input quotes in the forms of bids and offers into the system via their trader terminals. Quotes have a price and an amount or size. These quotes are matched with other quotes in the system by a matching engine or arbitrator. Where a match is found, a deal will be executed between the parties, once it has been established that each party has sufficient credit with the other for the deal. A hardware component referred to as a broker sits or is located between the arbitrator and a dealing floor, at which sits or is located a credit matrix representing the bi-lateral credit relationships (granted and received) of a bank with each counterparty on the system. The broker is responsible for constructing a market view for each trading floor (deal code) based on their bi-lateral credit relationships as represented by the binary credit matrix stored at the broker. Thus, traders at a given trading floor are only shown quotes input into the system by parties with whom they have credit. In this platform, the actual credit limits are stored at the broker.

Once a deal has been concluded, details of the trade, including price, size and counterparty details are exchanged between counterparties to the trade. Only counterparties to a trade are informed of size and counterparty name but the rate at which the trade took place will be included within a market data feed, in this example, EBS Market Data including paid, given, highs, and lows and this is published more widely and available to other traders.

In this platform generally, visible quotes are matched with other quotes and/or hits (referred to as buys/sells or IOCs (immediate or cancel)) in the system by the matching engine or arbitrator. In examples of the present invention operating on this platform, in some circumstances, visible quotes are matched with other quotes and/or hits by the matching engine or arbitrator in price/time priority.

In price/time priority, when two or more parties submit orders in an attempt to match a visible order, quotes with the best visible price are matched first, if there are two or more quotes at the same price, they are matched in time input into the system priority (the first order received is matched).

In more detail, in the electronic trading system or electrical computer system processing architecture 10 of FIG. 1, Tier 1 or the core hosts the matching engines, or arbitrators 12 each provided as a resource on a server. These are each a single computer or group of computers on a network. In this example, only one arbitrator is shown for simplicity. However, in practice, three arbitrators are used one in each major trading center of Europe (London), America (New York) and Asia (Tokyo). The arbitrators have a global view of the market, facilitating global liquidity. This tier also supports centralized transactional persistence and analysis using log manager 14 and persistent store 16. Again, this is a computerized process with the functionality being carried out by one or more computers on a network. The arbitrators are constantly synchronized, so that quotes submitted in a single region are instantly available globally. Thus, servers in each country can expect to see varying activity throughout the day in which the server is located as trading days in the different countries happen. A peak in activity can broadly be expected when more than one trading day in the major trading centers is happening.

The primary roles of an arbitrator or matching engine 12 are to maintain the global order book and credit books for its region, propose deals by matching credit compatible orders and quotes and distribute market data to other arbitrators and downstream computerized components. In particular, the matching engine matches maker quotes in an order book with takes. The quotes and takes are input by trader input devices as described further below.

Transactions from each arbitrator are synchronously persisted in redundant log files. This guarantees that no transactional data is ever lost. Transactional data is also passed in real time to the market data subsystem (formed of one or more computers on a network) for analysis and archiving.

The arbitrator computer or matching engine 12 communicates with brokers or computerized brokers 18. Each broker is formed of one or more computers on a network. Only a single broker is shown in FIG. 1 for simplicity. In practice, a plurality of brokers is provided. The brokers are housed in tier 2 or regional distribution site. The brokers manage the interaction between the trading workstations or trader input devices or clients of tier 3 (described below) and the core of tier 1 described above. Each broker represents a group of trading floors on which the trader input devices reside to the core. The broker's database 20 (run on one or more computers on a network) persists the floor-specific configuration settings and deal history.

The brokers are electronic agents which represent a trading floor to the electronic trading system. Trading floor configuration settings, including entitlements, credit limits, and settlement instructions, are persisted in the broker database. The broker disseminates market views and news to its trading floors and manages the lifecycle of orders and deals for its floors. During trade negotiation, the broker handles the fine-grained credit validation and exchange of settlement instructions between counterparty floors.

A single broker represents a group of trading floors in its geographical proximity. In this example, brokers are hosted in one of three regional distribution sites (London, New York, Tokyo).

Tier 3 or the bank access floor hosts a real time view server (RTV) 22, which is a server that resides locally on a bank floor (in practice, it may be implemented by one or more computers on a network). It plays an important role in conserving network traffic and enhancing the speed and scalability of the trading system. As a floor-based server, the RTV performs all the floor-wide services for the trading entities (both spot (manual or human trader) workstations and spot automated trading servers) on its floor. These services include data aggregation, caching, and distribution. The RTV is also responsible for the delivery of completed deal information to the deal feed server on its floor. The RTV may be, for example, deployed as a stand-alone dedicated server or co-hosted on a spot workstation 24 provided in this tier, depending on the volume of transactions handled.

The spot workstation (or trader input device or client in the form of a manual trader-controlled input device) 24 is the trading system front-end application that provides spot trading functionality through an intuitive graphical user interface on a display. This functionality includes maker trader input device and taker trader input device functionality. Makers put requests, namely open orders or quotes in the form of bids and offers available to other traders, into the market. Takers hit the orders or quotes put into the market by makers. The quotes include a quote price and a quote size or amount. The manual trader-controlled input device or client includes price panels as part of its display that displays both the system-wide "best price" and the credit-screened "dealable best price" for a particular currency. Prices can be hit by takers directly from the price panel. It also includes quote panels that are used to provide requests or, in other words, submit or input a quote in the form of a bid or offer into the trading system.

This tier also includes a spot automated trading server 26 (another type of trader input device, that takes the form of one or more computers on a network) that supports automated trading by exposing an XML interface to the trading system. This too may act both as a maker trader input device and a taker trader input device. The server is an automated trading interface that provides for direct integration between a customer's trading engine and the trading system, thereby enabling model or program trading and the maintenance of a 24-hour order book. Full trading capability is exposed using the XML interface which can be accessed directly by the customer's model applications, which may include mathematical models, arbitrage models, and risk management models. The server is the component that intermediates between the customer-provided trader input device 24 in the form of a client and the trading system.

Architecturally, the server is similar to a workstation, except that whereas a workstation intermediates between a graphical user interface on a display and trading messages, the server translates from XML messaging protocol to the trading messages. Also similar to a workstation, the server performs the tasks of user authentication and input validation. XML messages are validated both for conformance to the XML protocol and for compliance with trading system dealing rules.

This tier also hosts a computerized deal feed system 28 (in the form of one or more computers on a network) that provides a feed of completed deal information for straight through processing (STP); it automates the delivery of post-deal information including delivering completed deal tickets to a deal feed database 30 run on one or more computers.

Finally, tier 4 on the customer site on the customer network, includes processes outside the trading system provider firewall, including, in this example, customer STP processors 32 (provided by one or more computers on a network) and an automated trading client 34 (provided by one or more computers on a network).

The automated trading client or Ai client 34 is any customer managed application that communicates with the Ai server through the trading system XML protocol. The clients may be written in, for example, Java, C++, Microsoft Excel, or any language that can create XML messages conforming to the trading system protocol.

Embodiments of the present invention are not limited to any particular architecture and may be implemented on the system described above and on other systems. While XML is described as an example of the messaging protocol used, other messaging protocols could be used.

The servers in the form of matching engines or arbitrators 12 of embodiments of the present invention maintain the order book.

Broadly, each trade is marked to market by deriving the PnL delta from the trade price against the post trade mid-price and expressed as a US dollar value. The trade PnL derived from the post trade mid-price is applied to the lifetime PnL of the two counterparties in the form of a PnL insurance premium. Lifetime PnL is expressed in US Dollars. Therefore, the trade's PnL Insurance Premium is converted into the US Dollars before being applied to the Lifetime PnL. As such, conversion rate samples will be taken at the same time as the Post Trade Mid samples.

Each trade gets assigned three prices: match price, MtM price and settlement price. Match price is the price assigned to the trade at conception. The MtM price reflects the current market value. MtM price is the price assigned to the trade a predetermined time after conception (typically in the order of seconds) to quantify the PnL attribution. Settlement price is the price that is to be paid by the two counterparties.

When two counterparties start trading, there will be a PnL position of zero attributable to the relationship. However, over time a PnL balance can accumulate. The electronic trading system or platform described herein aims to be a PnL neutral trading platform. As such, once the PnL balance exceeds a certain US dollar threshold, price improvement is applied to subsequent trades in favor of the counterparty with the loss position to reduce the PnL balance.

Each time a trade is done, the lifetime PnL value is updated in real-time by converting the delta or difference between the match price and the MtM price into a US dollar amount. In turn, every time a trade match occurs, the system looks up the lifetime PnL value between the two counterparties in real-time. If that value is above the configured or predetermined threshold, a configurable value of x pips (where x is a predetermined number) is applied to the match price in favor of the counterparty with the loss position to create the settlement price.

Figure 2:
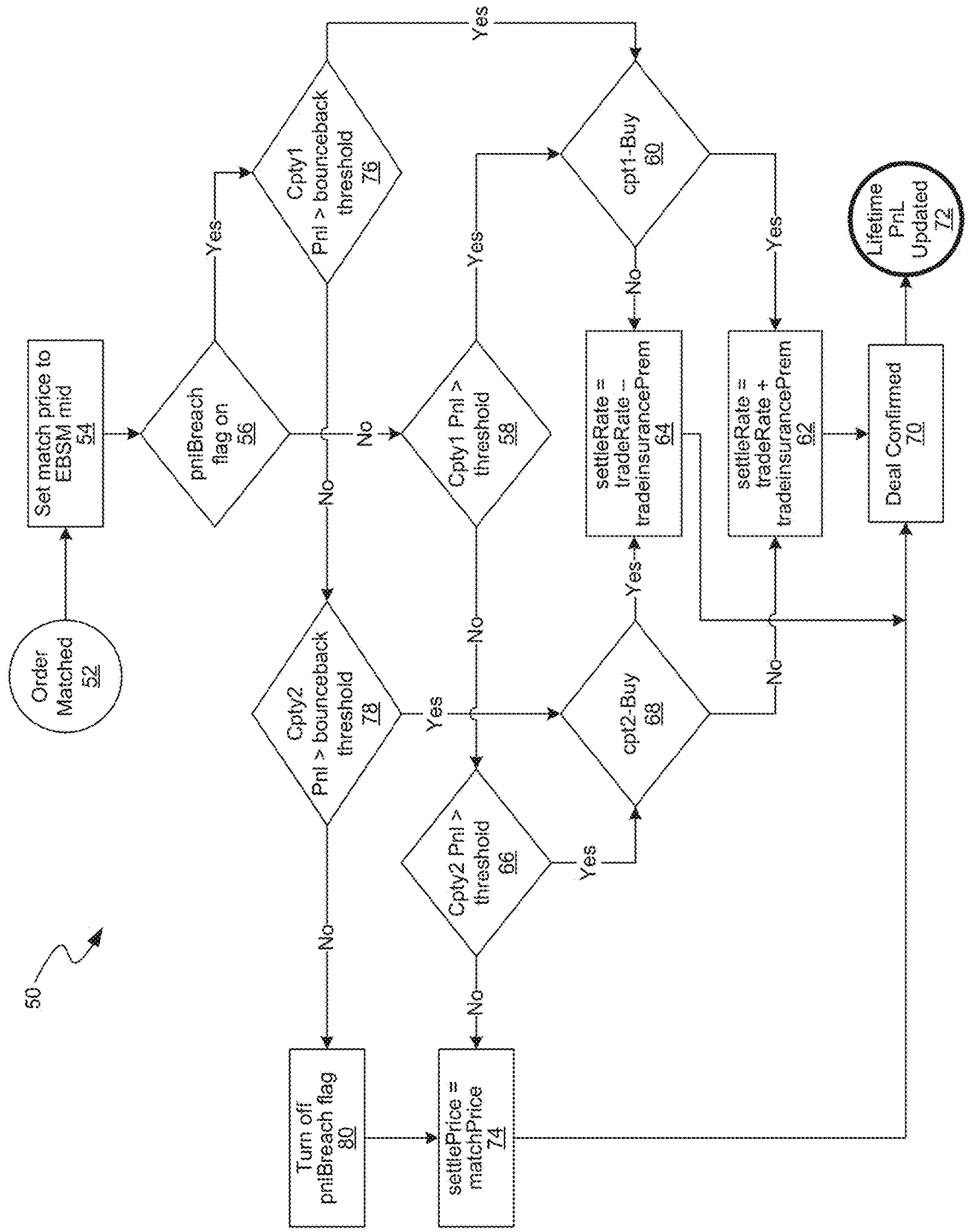
FIG. 2 is a flow diagram illustrating the method implemented by the electrical computer system processing architecture of FIG. 1.

Referring to the flow diagram 50 of FIG. 2, counterparties (counterparties 1 and 2) enter orders via their trading terminals, order input devices or client computers, such as workstation 24 or Ai client/server arrangement 34,26 of FIG. 1. Complementary orders (bids and offers) at the same price are matched 52 on the matching engine or arbitrator 12 (shown in FIG. 1) in time priority. A match price is set 54 based on the mid-price of an anonymous market, in this example, EBS markets. In this example, the mid-price is the average of the best quoted current bid and ask prices rounded to the nearest pip (the nearest tradable price on the trading system). This matched order also includes a PnL breach flag indicating whether the PnL position immediately before this new match between the counterparties had reached a predetermined threshold.

At step 56, the electronic trading system ascertains whether the PnL breach flag (whether the PnL position between the counterparties has reached a predetermined threshold) is on or off. If the flag is off, then at step 58, the electronic trading system ascertains whether the PnL of counterparty 1, following the new match, is now above the predetermined threshold. If so, the system ascertains at step 60 whether counterparty 1 is on the buy side or the sell side. If counterparty 1 is on the buy side, then a decision is made at step 62, which is dependent also on the PnL status of the other counterparty, counterparty 2. If counterparty 1 is on the sell side, then a decision is made at step 64, which is dependent also on the PnL status of the other counterparty, counterparty 2.

Referring back to step 58, if the electronic trading system ascertains whether the PnL of counterparty 1, following the new match, is still below the predetermined threshold, then at step 66, the electronic trading system ascertains whether the PnL of the other counterparty, counterparty 2, following the new match, is now above the predetermined threshold. If so, the system ascertains at step 68 whether counterparty 2 is on the buy side or the sell side (which leads to the same result as ascertaining whether counterparty 1 is on the buy side or the sell side, as counterparty 2 must be on the opposite or complementary side to counterparty 1). At step 64 (mentioned above), if counterparty 2 is on the buy side and counterparty 1 is on the sell side, then the settlement price or rate is set at the trade rate (which is the MtM price) minus the insurance premium (which is the price improvement level). The deal is then confirmed (step 70) and the lifetime PnL updated (step 72). At step 62 (mentioned above), if counterparty 2 is on the sell side and counterparty 1 is on the buy side, then the settlement price or rate is set at the trade rate (which is the MtM price) plus the insurance premium (the price improvement). The deal is then confirmed (step 70). The lifetime PnL is updated (step 72) by converting the delta or difference between the match price and the MtM price into a US dollar amount.

Referring back to step 66, if at step 66, the electronic trading system ascertains that the PnL of the other counterparty, counterparty 2, following the new match, is now at or below the predetermined threshold, then at step 74, the settlement price is set at the match price. The deal is then confirmed (step 70) and the lifetime PnL is updated (step 72) by converting the delta or difference between the match price and the MtM price into a US dollar amount.

We refer back now to step 56 and the situation, at step 56, where the electronic trading system ascertains that the PnL breach flag (whether the PnL position between the counterparties has reached a predetermined threshold) is on and a decision is then made at step 76. At step 76, if the electronic trading system ascertains that the PnL of counterparty 1, following the new match, is still above the predetermined threshold then a decision is made at step 60 and the method continues as explained above. If at step 76, the electronic trading system ascertains that the PnL of counterparty 1, following the new match, is now below the predetermined threshold then a decision is made at step 78 as to whether or not the PnL of the other counterparty, counterparty 2, is now above the predetermined threshold. If so, then a decision is made at step 68 and the method continues as explained above. If not, then the method proceeds to step 80 and the PnL breach flag is turned or changed to off and the method continues from step 74 as explained above.

In this way, the risk positions of the counterparties are offset.

In this example, the MtM price is derived as explained below.

Broadly, the server, arbitrator or matching engine 12 (referring to FIG. 1) forms a central limit order book (CLOB) quote count product model (CLOB QC) that creates and utilizes dynamically calculated post trade time intervals based on a count of unique quotes entered into the CLOB. This measurement reflects market activity and volatility which is directly aligned with the risk holding periods for electronic trading desks at banks. In turn, these dynamic time intervals are used by other products of the trading system (such as EBS Brokertec products) to mark to market the value of trades a predetermined time (generally, of the order of seconds) after conception. Such a CLOB quote count model is available to the owner of a CLOB only.

Figure 3:
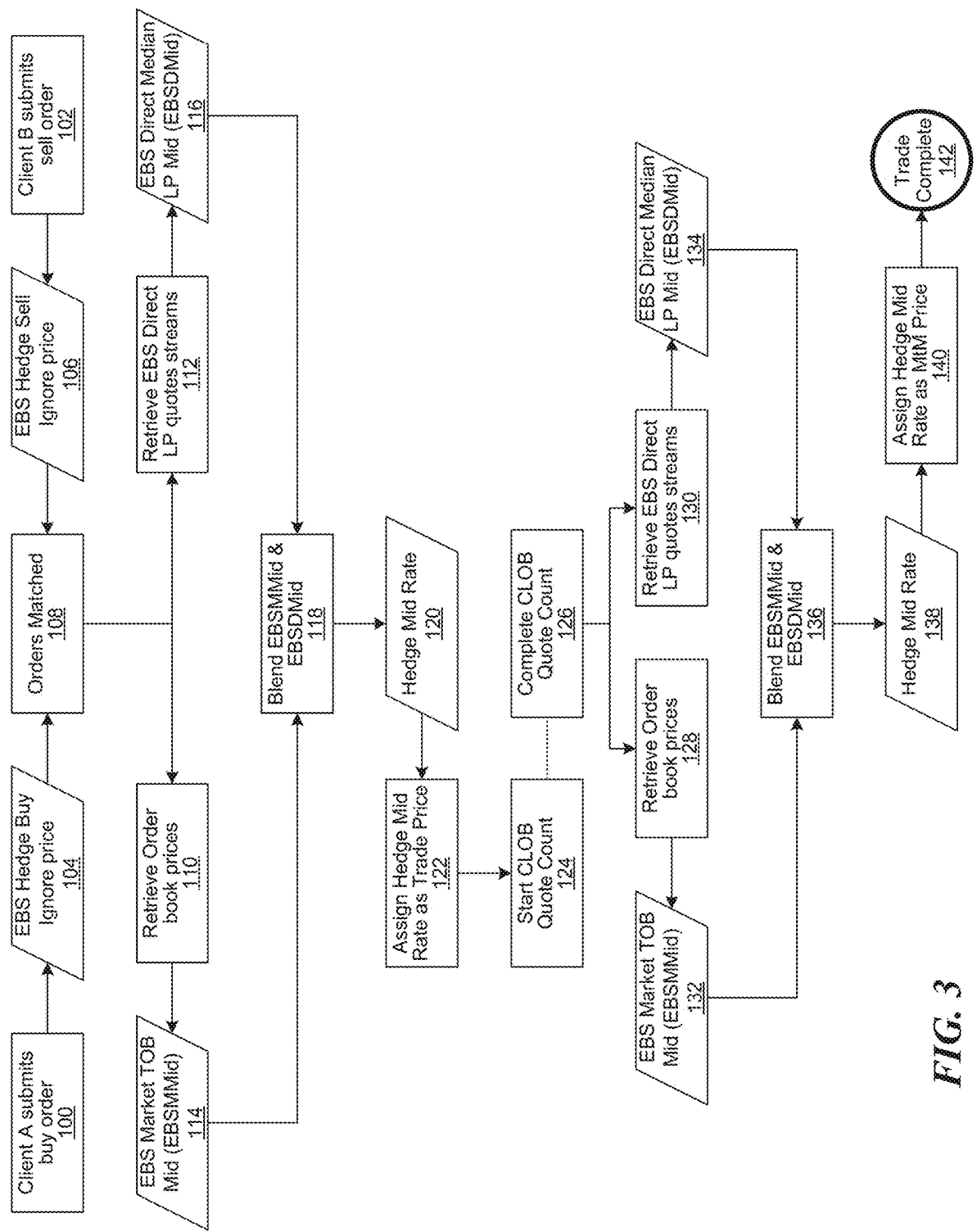
FIG. 3 is a flow diagram illustrating the method implemented by the electrical computer system processing architecture of FIG. 1.

Referring to FIGS. 1 and 3, for order or request matching, client floor codes are assigned to new Ai instances or servers 26 that will in turn be connected to Broker 18. Ai Clients 34 submit standard good 'til cancelled (GTC) orders, which may be complementary orders or requests such as buy 100 or sell 102 orders to the Ai instance. Preferably, clients submit zero prices for transparency. However, any prices applied are ignored on both the buy 104 and sell 106 side. All orders are subjected to configurable minimum quote life (MQL) by pair, with a day 1 setting of 3 seconds. Orders are matched by time priority. Once two orders are matched 108, they are subjected to the credit matrix checks described above.

The match price is derived from a blend of a mid-price from a market with anonymous prices (such as EBS Market) and a mid-price from a market with disclosed prices (such as EBS Direct). The weighting between the mid-prices from the two sources is configured at a per currency pair level. In other words, order book prices are retrieved from an anonymous market 110 and from a disclosed market 112 and a mid-price is calculated from each of these 114,116 and then blended 118 to produce a mid-rate 120. This mid-rate is assigned as a trade price 122.

Once a match occurs, a count is initiated 124 of all unique quotes in the order book of the matching engine for the respective currency pair of the match (this is described in more detail below with reference to FIG. 3) over a predetermined period of time. At the end of the count, when all relevant quotes have been counted 126, a mark to market (MtM) price is then derived. The MtM price is derived by retrieving order book prices from both the market with anonymous prices (such as EBS Market) 128 and the market with disclosed prices (such as EBS Direct) 130, deriving the mid-price of each of these markets 132,134 and then blending them together 136 in the same way that the match price described above is derived. This blended rate forms a mid-rate 138 of the counted quotes and it is this that forms the MtM price 140 completing the process 142.

The count is configurable per currency pair.

Figure 4:
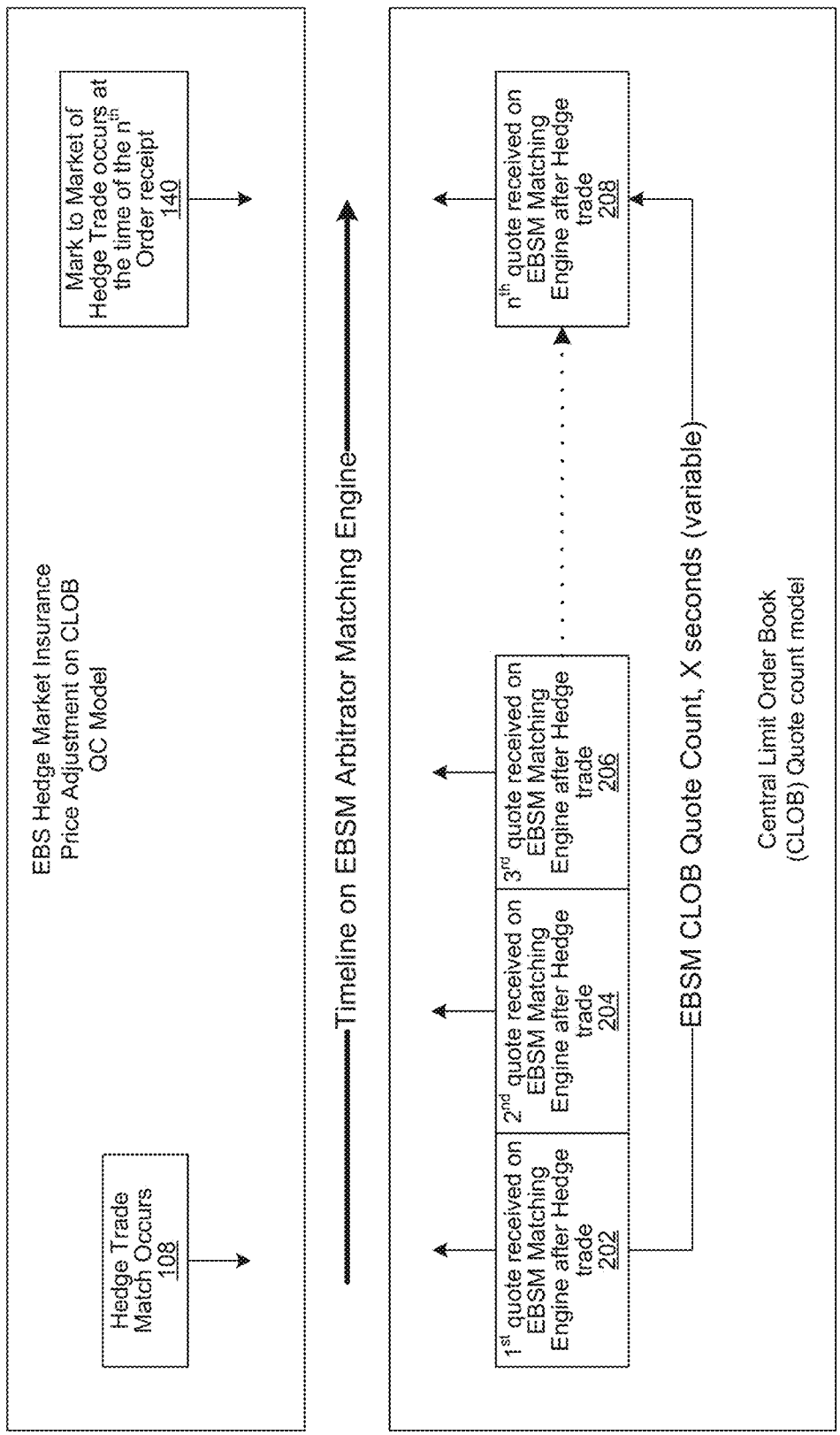
FIG. 4 is a timeline illustrating the method implemented by the electrical computer system processing architecture of FIG. 1.

As mentioned above, the timeline 200 of FIG. 4 illustrates the count initiated at step 124 of FIG. 3 of all unique quotes in the order book of the matching engine for the respective currency pair of the match. Once the initial match has occurred (the so-called hedge trade), prices of quotes 202, 204, 206, 208 received at the matching engine or server of the currency pair of interest over a predetermined time period of x seconds after the initial match are combined (where x is a number). These form the mid-prices that form the MtM price 140 described above.

Figure 5:
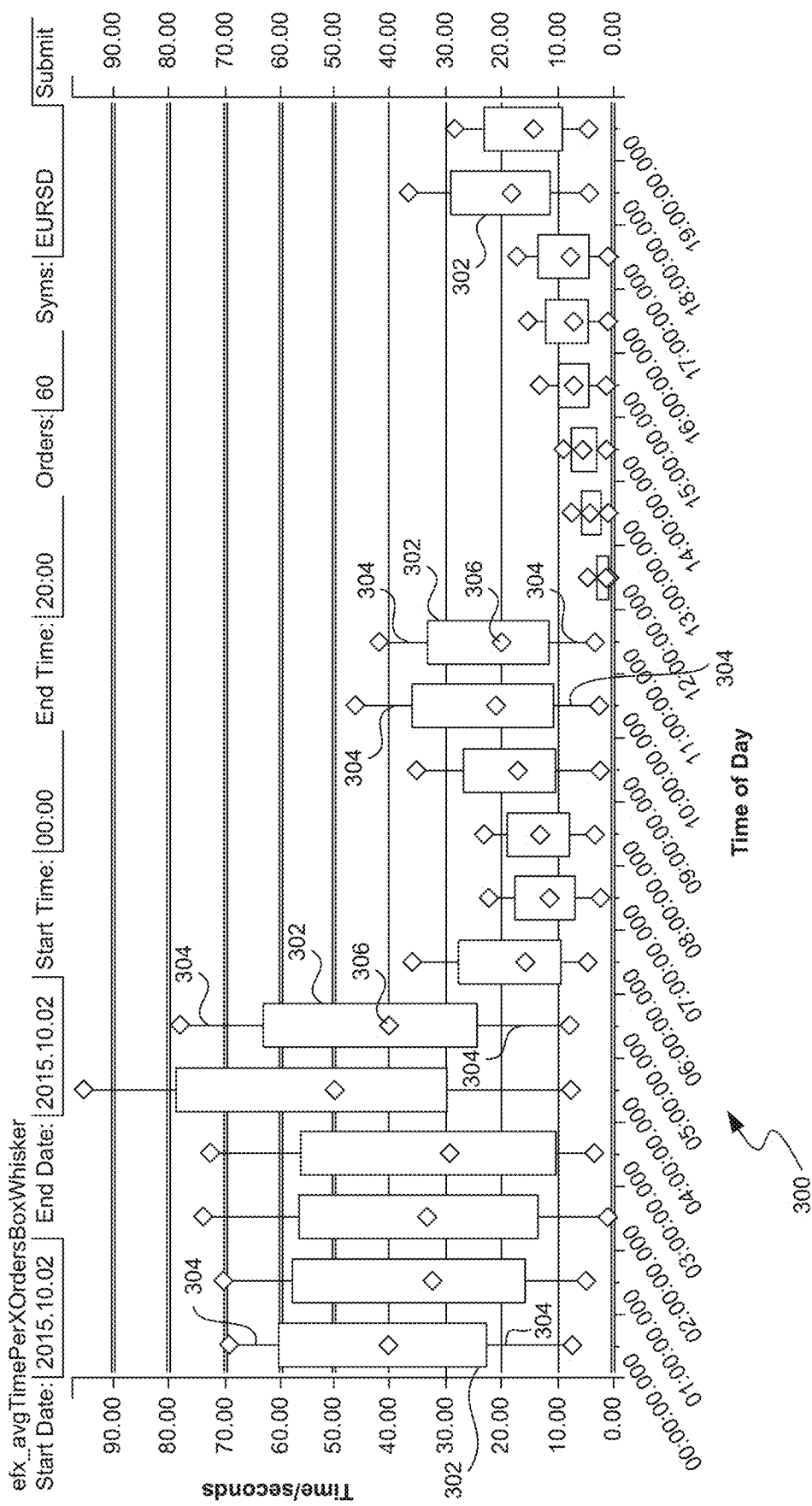
FIGS. 5 to 7 are graphs illustrating the effectiveness of the electrical computer system processing architecture of FIG. 1.

The graph 300 of FIG. 5 illustrates how these time intervals for currency pair EURUSD (Euro to United States dollar) change over the course of a 20-hour trading period (from 20:00-24:00 GMT the markets become very thin and illiquid and are not calculated here). In London/New York cross over (between 12:00-17:00 GMT) when both markets are open, the average time period to reach an order count of 60 takes 5.4 seconds and the range is between 1.5 seconds and 8.2 seconds. The average for the trading day 00:00 GMT to 20:00 GMT is 19.6 seconds and the average range is 1.5 seconds to 50 seconds. The graph of FIG. 5 illustrates that time periods for quote activity vary throughout the course of the trading day.

The graph 300 of FIG. 5 illustrates EBS Markets (a combination of anonymous and disclosed markets) CLOB quote count as a percentile box plot. In this plot, 50% of the time is within each box 302 (only some of the boxes have been given reference numerals for clarity) and whiskers 304 show the 5th and 85th percentiles (only some of the whiskers have been given reference numerals for clarity). The quote count is plotted in seconds per 60 orders and the medians are plotted as boxes 306 (only some of the boxes have been given reference numerals for clarity).

The graph 300 of FIG. 5 illustrates that when data is released at 12.30, the underlying market moves up 1.25% in minutes, from 1.1160 to 1.1300. The CLOB quote count drops from an average time to 60 orders of 20 seconds the hour before to only an average of 1.5 seconds in the following hour.

Figure 6:
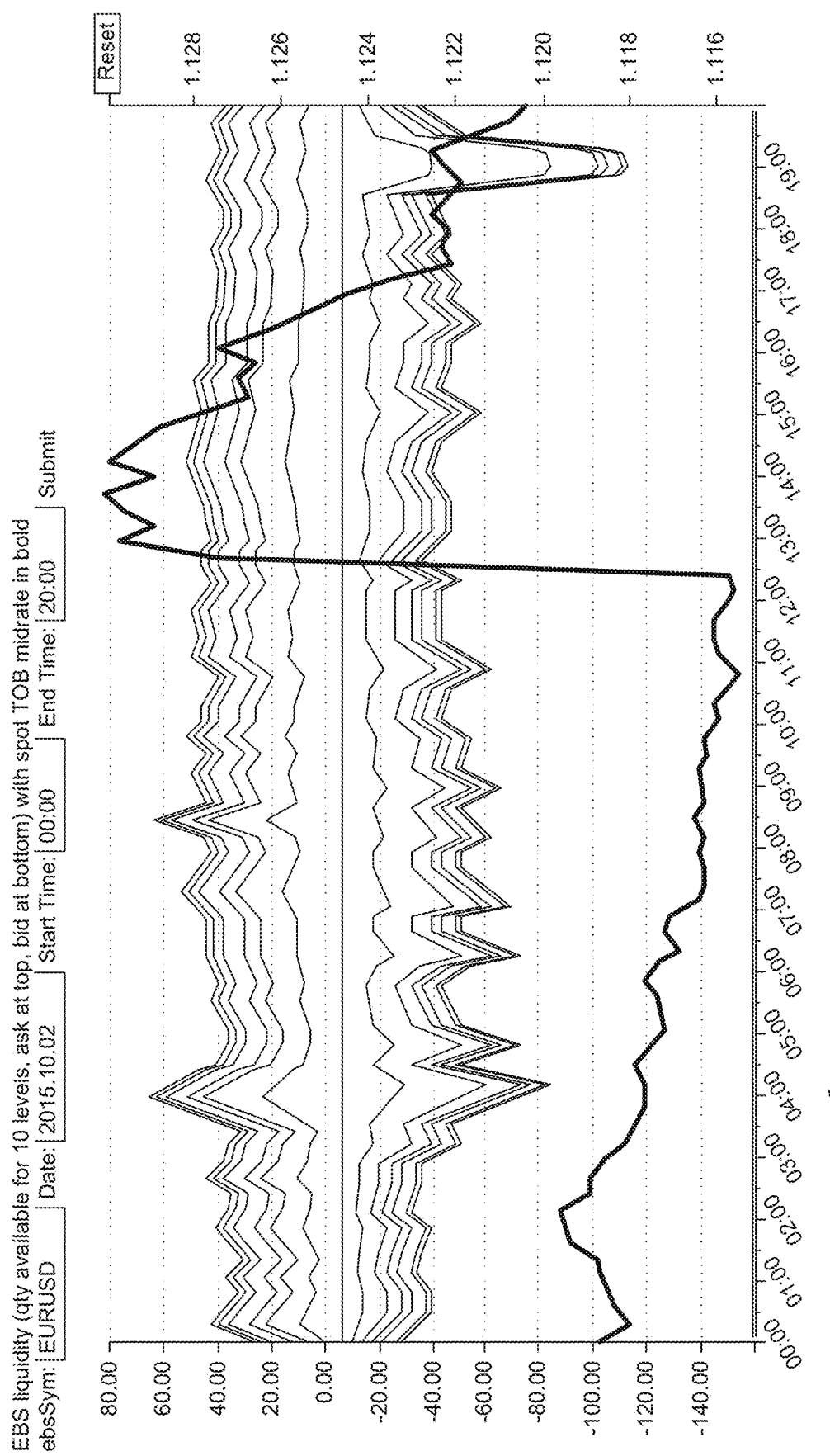

The graph 400 of FIG. 6 illustrates the quantity in Millions EUR for 10 levels of the EBS Markets (a combination of anonymous and disclosed markets) CLOB (ask quotes are at the top, bid quotes are at the bottom, plotted on the left hand axis in millions) 402 and the EBS Markets CLOB EURUSD mid-rate (in white, plotted on right hand side in Percent Per annum price volatility) 404.

Figure 7:
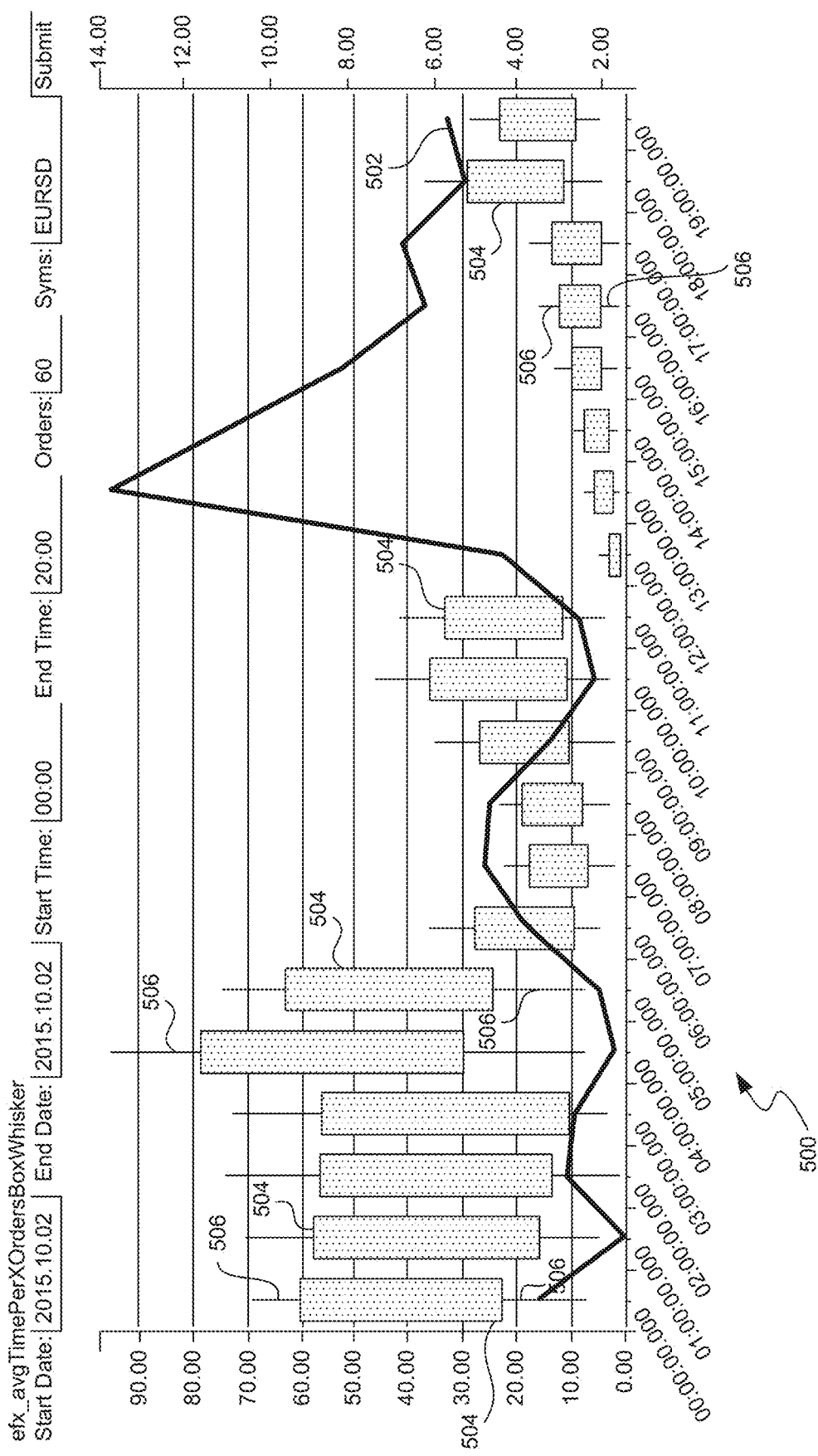

The graph 500 of FIG. 7 is a simple plot of the CLOB quote count versus a standard deviation average of the asset price (in white 502 with scale on the right-hand side). The graph of FIG. 7 shows EBS Markets (a combination of anonymous and disclosed markets) CLOB quote count as a percentile box plot with 50% of time within each blue box 504 (only some of the boxes have been given reference numerals for clarity), whiskers 506 showing 5th and 85th percentiles (only some of the whiskers have been given reference numerals for clarity) plotted in seconds per 60 orders and the time scale is in seconds on the left hand axis; and a standard deviation of the EBS Markets CLOB EURUSD mid-rate (in white 508, plotted on the right hand side in percent per annum price volatility).

The graph 500 of FIG. 7 shows how the CLOB quote count is higher when volatility is low and vice versa. However, the CLOB quote count is more responsive and introduces a lower average time period pre or before the midday data release compared to the standard deviation. When the price moves, the CLOB quote count responds immediately to a lower time period compared to a standard deviation model.

Embodiments of the present invention have been described. It will be appreciated that variations and modifications may be made to the described embodiments within the scope of the present invention.

The invention claimed is:

1. A computer implemented method for automatically equalizing price advantage of a plurality of electronic transactions between a first party and a second party by a matching engine of a computer arbitrator, the computer implemented method comprising:
    identifying, by the matching engine, the plurality of electronic transactions between the first party and the second party, each of the plurality of electronic transactions assigned a first value, a second value, and a third value;
    calculating, by the matching engine, a profit and loss (PnL) balance between the first party and the second party as a sum of differences between the first value and second value of each electronic transaction of the plurality of electronic transactions;
    setting, when the profit and loss balance exceeds a predetermined threshold, a profit and loss flag that a price improvement should be applied to future electronic trades between the first and second parties to a party of the first and second parties that has an accumulated loss position in the profit and loss position;
    identifying, by the matching engine based on the set profit and loss flag, a subsequent electronic transaction between the first party and the second party;
    assigning, by the matching engine, the subsequent electronic transaction a fourth value and fifth value;
    calculating, by the matching engine, an updated PnL balance between the first party and the second party as a sum of the PnL balance and a difference between the fourth value and the fifth value;
    detecting, by the matching engine, whether the updated PnL balance exceeds a predetermined threshold for the first party; and
    when the updated PnL balance exceeds a predetermined threshold for the first party, calculating and assigning, by the matching engine, a sixth value for the subsequent electronic transaction as a function of a difference between the fifth value and a seventh value.

2. The computer implemented method of claim 1, wherein the first values and the fourth value are respective match prices, the second values and the fifth value are respective mark-to-market price, and the third values and the sixth value are respective settlement prices.

3. The computer implemented method of claim 1, wherein the accumulated PnL balance and the updated PnL balance are stored in a bilateral ledger.

4. The computer implemented method of claim 1, wherein the first values and fourth value are set based on a mid-value of an anonymous market.

5. The computer implemented method of claim 4, wherein the mid-value is an average of a best quoted current bid and ask prices rounded to a nearest pip in the anonymous market.

6. The computer implemented method of claim 1, wherein the seventh value is an insurance premium.

7. The computer implemented method of claim 1, wherein the second values and the fifth value are derived by retrieving order book prices from both a first market with anonymous prices and a second market with disclosed prices.

8. An electronic trading system for automatically equalizing price advantage of electronic trade requests provided by a first party and a second party by an arbitrator computer, the electronic trading system comprising:
    a data store for storing the electronic trade requests provided by the first party and the second party; and
    an arbitrator computer including a matching engine coupled to the data store, the matching engine configured to:
        set, when a profit and loss balance exceeds a predetermined threshold, a profit and loss flag that a price improvement should be applied to future electronic trades between the first and second parties to a party of the first and second parties that has an accumulated loss position in the profit and loss position;
        identify, based on the set profit and loss flag, a subsequent electronic trade between the first party and the second party from the stored trade requests;
        calculate a match price and a mark-to-market price for the subsequent electronic trade;
        determine whether a stored value that represents an accumulated difference between match prices and mark-to-market prices of a plurality of previous trades between the first party and second party exceeds a predetermined threshold; and
        when the stored value exceeds the predetermined threshold, calculate a settlement price for the subsequent electronic trade by:
        adding a predetermined number of pips to the match price for the first party when the first party is on the buy side; and
        subtracting a predetermined number of pips to the match price for the first party when the first party is on the sell side.

9. The electronic trading system of claim 8, wherein the match price is calculated based on a mid-price of an anonymous market.

10. The electronic trading system of claim 9, wherein the mid-price is an average of a best quoted current bid and ask prices rounded to a nearest pip in the anonymous market.

11. The electronic trading system of claim 8, wherein the predetermined number of pips are calculated from an insurance premium.

12. The electronic trading system of claim 8, wherein the mark-to-market price is derived from order book prices from both a first market with anonymous prices and a second market with disclosed prices.

13. The electronic trading system of claim 8, wherein the subsequent electronic trade is matched by time priority provided by the first party and the second party.

14. A non-transitory computer implemented storage medium for automatically equalizing price advantage of electronic orders between counterparties, the non-transitory computer implemented storage medium having machine-readable instructions stored therein, that when executed by at least one processor, cause the at least one processor to:
    match the electronic orders between the counterparties;
    assign a mid-price and a mark-to-market price to each matched electronic order;
    form a profit and loss position between the counterparties based on an accumulated difference between a mid-price and a mark-to-market price for a plurality of previously matched orders between the counterparties; and when the profit and loss position exceeds a predetermined threshold, set a profit and loss flag that a price improvement should be applied to future electronic trades between the counterparties to a party of the counterparties that has an accumulated loss position in the profit and loss position and, based on the profit and loss flag, apply the price improvement to the party of the counterparties that has an accumulated loss position in the profit and loss position of a subsequent trade between the counterparties.

15. The non-transitory computer implemented storage medium of claim 14, wherein the mid-price is an average of a best quoted current bid and ask prices rounded to a nearest pip in an anonymous market.

16. The non-transitory computer implemented storage medium of claim 14, wherein the price improvement relates to an insurance premium.

17. The non-transitory computer implemented storage medium of claim 14, wherein the mark-to-market price is derived from order book prices from both a first market with anonymous prices and a second market with disclosed prices.

18. The non-transitory computer implemented storage medium of claim 14, further comprising instructions stored therein, that when executed by the at least one processor, cause the at least one processor to:

when the profit and loss position is less than or equal to the predetermined threshold, turn the profit and loss flag off.

19. The non-transitory computer implemented storage medium of claim 14, wherein the profit and loss position is stored in a bilateral ledger between the counterparties.

20. The non-transitory computer implemented storage medium of claim 14, wherein the electronic orders between counterparties are matched by time priority provided by the counterparties.

* * * * *